(12) United States Patent
Price et al.

(10) Patent No.: US 6,356,186 B1
(45) Date of Patent: Mar. 12, 2002

(54) VEHICLE ANTI-THEFT SYSTEM AND METHOD

(75) Inventors: Todd Louis Price, Walled Lake; Simon Alexander Robbie, Belleville; Thomas Alan Diefenbaker, Troy, all of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/275,580

(22) Filed: Mar. 24, 1999

(51) Int. Cl.$^7$ ................................................ B60R 25/10
(52) U.S. Cl. .................... 340/426; 340/5.54; 340/425.5; 340/441; 180/287; 307/10.2; 701/99
(58) Field of Search ................................ 340/426, 438, 340/439, 825.54, 825.52, 425.5, 543, 441, 5.1, 5.2, 5.51, 5.54; 701/2, 23, 24, 99, 101; 180/168, 287; 364/424.04, 424.03, 431.11, 43.12; 307/10.2, 10.3, 10.4, 10.5

(56) References Cited

U.S. PATENT DOCUMENTS

| | | | |
|---|---|---|---|
| 3,718,202 A | 2/1973 | Brock | 180/287 |
| 4,090,089 A | 5/1978 | Morello et al. | 340/5.54 |
| 4,223,654 A | 9/1980 | Wessel et al. | |
| 4,691,801 A | * 9/1987 | Mann et al. | 180/287 |
| 4,805,722 A | 2/1989 | Keating et al. | 180/287 |
| 5,113,427 A | * 5/1992 | Ryoichi et al. | 379/57 |
| 5,131,371 A | 7/1992 | Wahl et al. | |
| 5,165,373 A | 11/1992 | Cheng | |
| 5,165,579 A | 11/1992 | Lund | |
| 5,231,962 A | 8/1993 | Osuka et al. | |
| 5,247,279 A | * 9/1993 | Sato | 340/426 |
| 5,313,924 A | 5/1994 | Regueiro | |
| 5,317,998 A | 6/1994 | Hanson et al. | |
| 5,357,926 A | 10/1994 | Hu | |
| 5,402,760 A | 4/1995 | Takeuchi et al. | |
| 5,431,607 A | * 7/1995 | Alder et al. | 477/4 |
| 5,445,128 A | 8/1995 | Letang et al. | |
| 5,477,827 A | 12/1995 | Weisman, II et al. | |
| 5,483,927 A | 1/1996 | Letang et al. | |
| 5,491,631 A | * 2/1996 | Shirane et al. | 364/424.04 |
| 5,494,219 A | 2/1996 | Maley et al. | |
| 5,647,317 A | 7/1997 | Weisman, II et al. | |
| 5,673,017 A | * 9/1997 | Dery et al. | 340/426 |
| 5,732,676 A | 3/1998 | Weisman et al. | |
| 5,771,865 A | 6/1998 | Ishida | |
| 5,828,297 A | * 10/1998 | Banks et al. | 340/426 |
| 5,835,868 A | * 11/1998 | McElroy et al. | 701/2 |
| 5,870,020 A | * 2/1999 | Harrison, Jr. | 340/426 |
| 6,060,981 A | 5/2000 | Landes | 340/426 |

* cited by examiner

*Primary Examiner*—Jeffery Hofsass
*Assistant Examiner*—Davetta W. Goins
(74) *Attorney, Agent, or Firm*—Brooks & Kushman P.C.

(57) ABSTRACT

A vehicle anti-theft system and method that operates the engine in a theft protection mode in which the engine is permitted to operate at idle or speed limited is provided. The method includes receiving an arm password, comparing the arm password with a stored password in the memory, and operating the engine in the theft protection mode when the arm password matches the stored password.

20 Claims, 2 Drawing Sheets

VEHICLE ANTI-THEFT SYSTEM AND METHOD

TECHNICAL FIELD

The present invention relates to a vehicle anti-theft system and method.

BACKGROUND ART

In the control of fuel injection systems, electronic control units having volatile and non-volatile memory, input and output driver circuitry, and a processor capable of executing a stored instruction set are utilized to control various functions of the engine and its associated systems. A particular electronic control unit communicates with numerous sensors, actuators, and other electronic control units necessary to control various functions, which may include, for example, various aspects of fuel delivery and transmission control.

With vehicles, and particularly with heavy-duty trucks, it is very desirable to have a vehicle anti-theft system. In an existing vehicle anti-theft system for a heavy-duty truck, the anti-theft system is only armed when the engine is shutdown. The armed anti-theft system simply does not allow the truck to start. With the heavy-duty trucking industry becoming more and more competitive, advanced engine features such as anti-theft protection are becoming significantly more important. As such, although some anti-theft protection systems have been used on vehicles in the past, it is desirable to provide a system and method that allows more advanced anti-theft protection with additional functionality.

DISCLOSURE OF INVENTION

It is therefore an object of the present invention to provide a vehicle anti-theft system and method that provide added functionality.

In carrying out the above object and other objects and features of the present invention, a vehicle anti-theft method for use in a vehicle having an internal combustion engine, an engine controller, and a memory, is provided. The method comprises receiving an arm password, comparing the arm password with a stored password in the memory. The method further comprises operating the engine in a theft protection mode in which the engine is permitted to operate at idle, when the arm password matches the stored password.

Preferably, the arm password is either received by manually entering the arm password, or is received by inserting a removable storage medium into a storage medium reader and subsequently reading the arm password from the removable storage medium. In a preferred embodiment, in addition to the arm password matching the stored password, at least one additional condition must exist to allow the engine to operate in the theft protection mode. As such, a preferred method further comprises checking the condition of the parking brake. The engine is operated in the theft protection mode when the arm password matches the stored password and the parking brake is engaged. Otherwise, the engine is operated in a different mode, such as, for example, a normal operating mode.

Further, a preferred method further comprises checking the condition of the vehicle speed sensor. The engine is operated in the theft protection mode when the arm password matches the stored password and the vehicle speed sensor indicates that the vehicle is stationary. Otherwise, the engine is operated in a different mode, such as, for example, a normal operating mode.

Embodiments of the present invention may employ a variety of different engine protection modes. For example, the theft protection mode for the engine may be configured to permit the engine to be shutdown and then manually restartted to idle. Further, for example, the theft protection mode for the engine may be configured to permit the engine to operate in a speed limited mode in addition to idle operation. The speed limited mode may be defined by an engine speed limit which engine speed is not permitted to exceed when in the theft protection mode. Alternatively, the speed limited mode may be defined by a road speed limit which vehicle road speed is not permitted to exceed when in the theft protection mode.

Further, in carrying out the present invention, a vehicle anti-theft method for use in a vehicle having an internal combustion engine, an engine controller, and a memory, is provided. The method comprises receiving an arm password, comparing the arm password with a stored password in the memory, determining a desired theft protection mode, and operating the engine in the desired theft protection mode when the arm password matches the stored password. The desired theft protection mode is determined from a plurality of theft protection modes. The plurality of theft protection modes includes at least one "idle" mode wherein the engine is permitted to operate at idle.

The desired theft protection mode may be determined based on current engine conditions, or may be selected by a vehicle operator. Preferably, the plurality of theft protection modes include a "no engine start" mode wherein the engine is shutdown and is not permitted to restart, and a "straight idle" mode in which the engine is held at idle (possibly allowing manual shutdown and restart). Further, the plurality of theft protection modes preferably further includes a toggle idle mode in which the engine is switched between shutdown and idle based on at least one vehicle condition. The engine is preferably switched based on a vehicle cabin temperature, oil temperature, or battery voltage.

Still further, in carrying out the present invention, a vehicle anti-theft system for use in a vehicle having an internal combustion engine, an engine controller and a memory, is provided. The system comprises a display unit including an input device for receiving an arm password, and control logic. The control logic is operative to compare the arm password with a stored password in the memory. The control logic is further operative to determine a desired theft protection mode from a plurality of theft protection modes. The plurality of theft protection modes includes at least one "idle" mode wherein the engine is permitted to operate at idle, and a "no engine start" mode wherein the engine is shutdown and is not permitted to restart. The desired theft protection mode is determined as the at least one "idle" mode if the engine is operating at idle upon receiving the arm password. The desired theft protection mode is determined as the "no engine start mode" if the engine is shutdown upon receiving the arm password. The control logic is further operative to operate the engine in the desired theft protection mode when the arm password matches the stored password. Alternatively, the desired theft protection mode may be determined from a calibrated value in the engine control module (ECM).

The input device may be, for example, a keypad for use by a vehicle operator to manually enter the arm password. Alternatively, the input device may be a storage medium reader for reading the arm password from a removable storage medium that is placed at the reader by a vehicle operator. Of course, the input device may take other forms and is not limited to those mentioned above.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
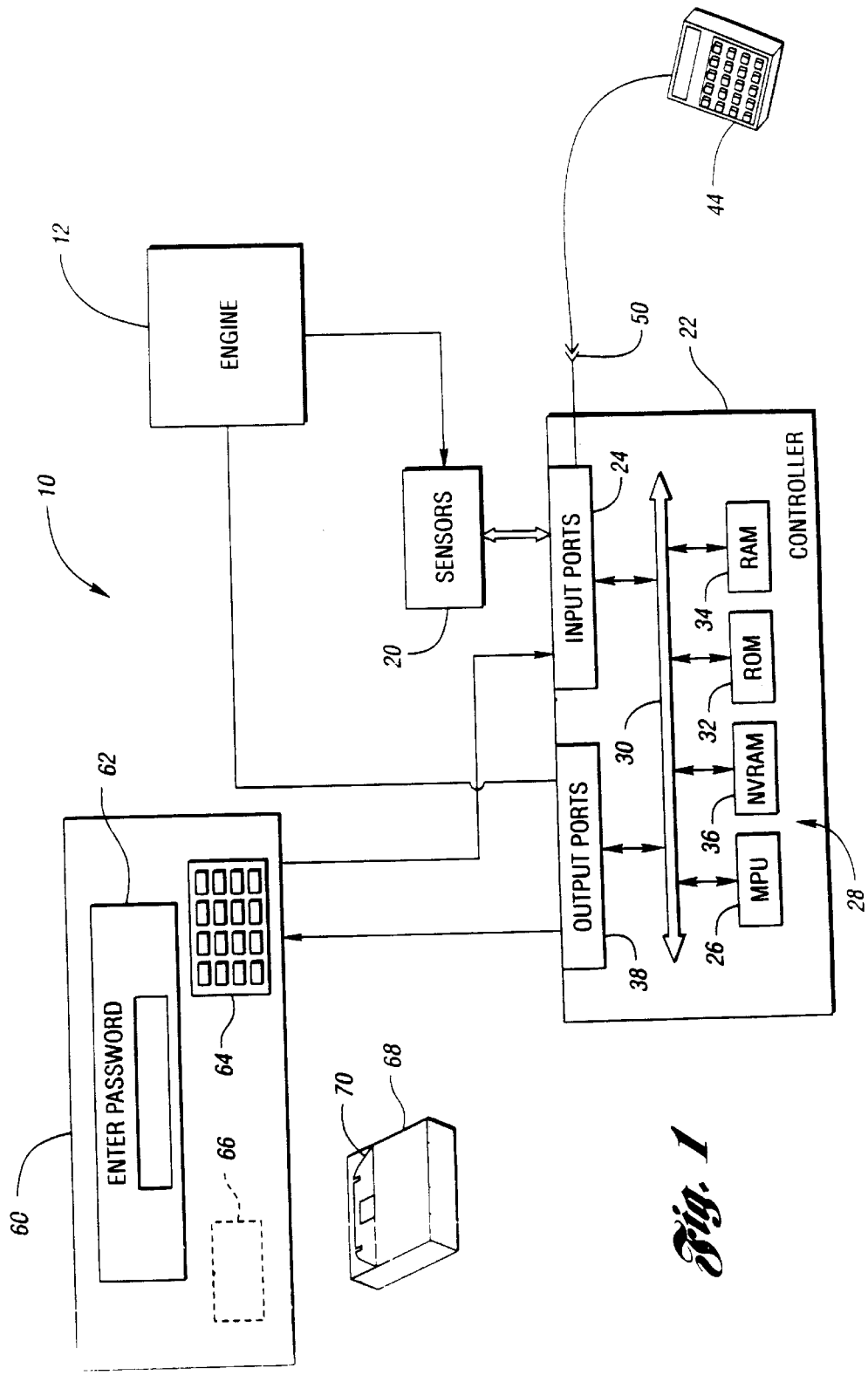
FIG. 1 is a schematic diagram of a fuel injection system made in accordance with the present invention.

Referring to FIG. 1, a system for controlling a heavy duty truck is shown. The system, generally indicated by reference numeral 10, includes an engine 12 having a plurality of cylinders, fed by fuel injection from fuel injectors or a common rail. In a preferred embodiment, engine 12 is a compression-ignition internal combustion engine, such as a four, six, eight, twelve, sixteen or twenty-four cylinder diesel engine, or a diesel engine having any other desired number of cylinders. The fuel injectors are receiving pressurized fuel from a supply connected to one or more high or low pressure pumps (not shown) as is well known in the art. Alternatively, embodiments of the present invention may employ a plurality of unit pumps (not shown), with each pump supplying fuel to one of the injectors.

The system 10 may also include various sensors 20 for generating signals indicative of corresponding operational conditions or parameters of engine 12, the vehicle transmission (not shown), and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, non-volatile random access memory (NVRAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 include various program instructions, software, and control logic to effect control of various systems and subsystems of the vehicle, such as engine 12, the vehicle transmission, and the like. Controller 22 receives signals from sensors 20 via input ports 24 and generates output signals which may be provided to various actuators and/or components via output ports 38.

A data, diagnostics, and programming interface 44 may also be selectively connected to controller 22 via a plug 50 to exchange various information there between. Interface 44 may be used to change values within the computer readable storage media 28, such as configuration settings, control logic and a desired theft protection mode calibration value when present.

In accordance with the present invention, system 10 includes a display unit 60 that is connected through an interface to controller 22 to activate and deactivate a vehicle theft protection mode of engine operation. Of course, in accordance with the present invention, there may be more than one theft protection mode, and preferably there are several theft protection modes that the vehicle operator may choose from, including "no start" mode, "idle" mode, "toggle idle" mode (suitably implemented as a part of OPTIMIZED IDLE which is available on engines from Detroit Diesel Corporation, Detroit, Mich.), and optionally a speed limited mode.

Display unit 60 includes a display 62 for displaying information to the vehicle operator, such as for example, a prompt to enter a password and theft protection mode status, that is, activated or deactivated. Preferably, theft protection mode is enabled by entering a password, and preferably, various other conditions must be met for engine protection mode to be activated. Preferably, display 62 may be utilized to communicate the status of the various additional required engine conditions in the event that one of these conditions is not met when the vehicle operator wishes to enter theft protection mode. A suitable display 60 is the PRODRIVER 2000 Display Unit, available from Detroit Diesel Corporation, Detroit, Mich. Of course, it is appreciated that the encryption algorithm of the display device must match that of the engine controller to send and receive encrypted passwords. As such, the PRODRIVER 2000 and the DDEC controller are configured accordingly. Alternatively, a conventional display device and engine controller may be arranged and configured to form embodiments of the present invention, provided that both the display device and the engine controller use the same encryption algorithm or that no encryption algorithm is used. That is, encryption is not required.

The input device for entering the password may be a variety of devices. For example, the input device may be a keypad 64 for use by a vehicle operator to manually enter the arm password. Alternatively, the input device may be a storage medium reader, shown in dashed line 66. Storage medium reader 66 reads the arm password from a removable storage medium 68 that is placed at reader 66 by the vehicle operator. As shown, removable storage medium 68 includes magnetic media 70. Of course, any type of media may be used, such as for example, optical media. One example of a suitable keypad is the PRODRIVER 2000 Display Unit keypad.

In a preferred embodiment, controller 22 monitors sensors and the display device interface and executes control logic in hardware and/or software, Preferably, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety. Further, the toggle idle mode mentioned above is preferably implemented as a part of OPTIMIZED IDLE. The operation of suitable toggle mode implementations are described in detail U.S. Pat. Nos. 5,317,998 and 5,732,676, both of which are hereby incorporated by reference in their entirety.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
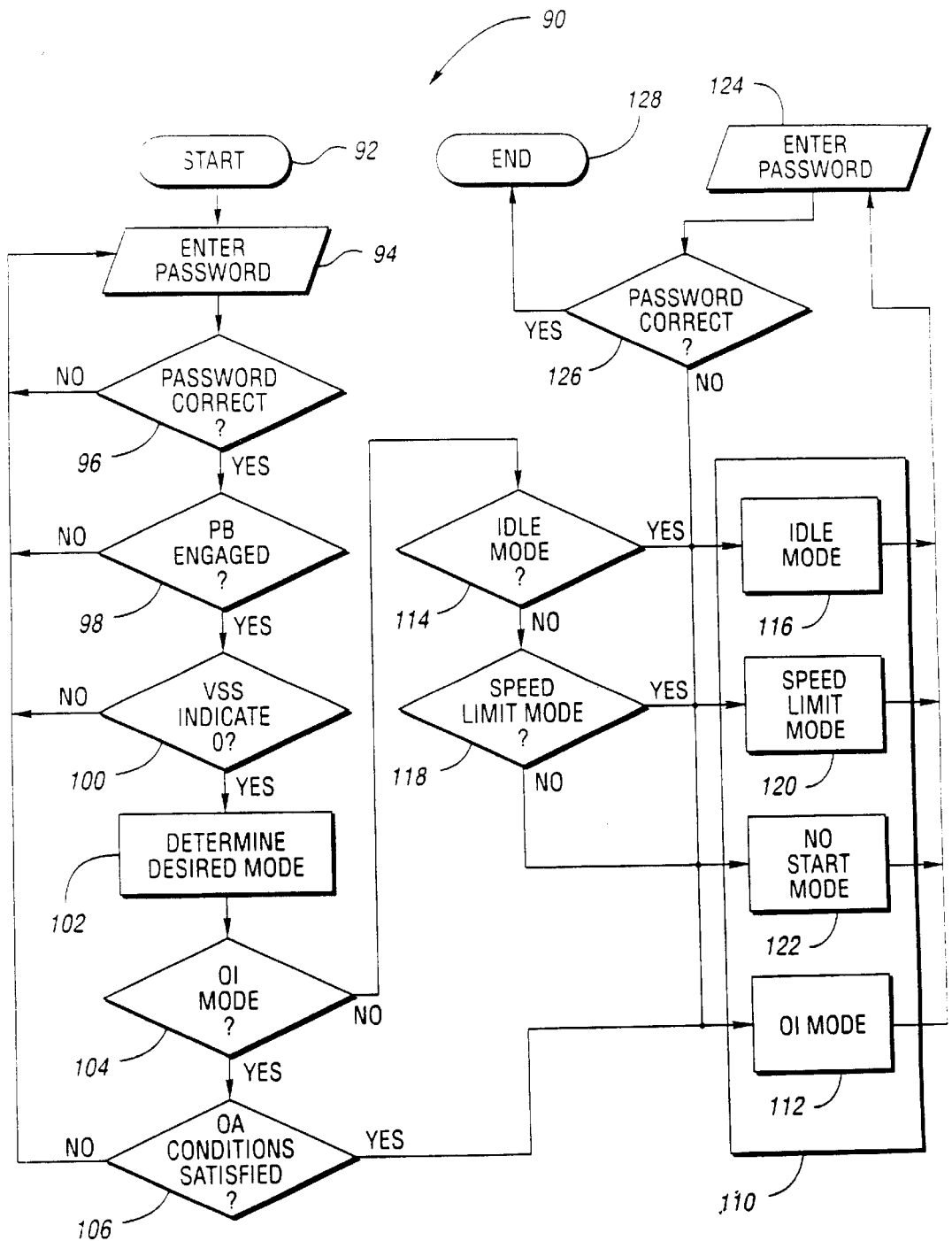
FIG. 2 is a block diagram illustrating a method of the present invention.

With reference now to FIG. 2, a flow chart 90 shows a method of the present invention for vehicle anti-theft protection, of course, it is to be appreciated that the flow chart is arranged to facilitate an understanding of the present invention, and that the order of the steps illustrated in FIG. 2 is not meant to be limited. That is, steps may be performed in a variety of orders and other equivalent control logic may be substituted therefor or used in addition to that illustrated in flow chart 90. At start block 92, the vehicle operator has the opportunity to activate the vehicle anti-theft mode. Preferably, the system may be armed while the engine is either shutdown or in an idle state. The anti-theft protection mode may be activated and deactivated, when the anti-theft feature is enabled in the ECM. Preferably, the anti-theft feature is enabled through a calibration parameter of the ECM that may be set with interface 44 (FIG. 1).

Once the engine is either off or idling, the driver may select from display 60 (FIG. 1) to activate anti-theft protection mode. After selecting to activate the anti-theft protection, the vehicle operator is prompted to enter a password as shown at block 94.

As mentioned previously, the password may be entered in a variety of different ways, such as, for example, a keypad or a removable storage medium. With the keypad 64 (FIG. 1), a driver enters the password, and the password is preferably encrypted using an algorithm prior to sending the password across the vehicle datalink to the ECM. At the ECM, the password is de-encrypted and compared with the stored password in memory, preferably in ECM EEPROM. Alternatively, a removable storage medium 68 (FIG. 1) or driver card may be inserted into an appropriate slot on the display unit. The storage medium reader 66 (FIG. 1) reads the password from the removable storage medium, and sends the password across the vehicle database in the same method that would occur if the vehicle operator had manually typed in the password. Preferably, the display unit only prompts the driver to input the password when the computer readable storage medium is not present so that a driver may leave the medium in place if desired. The password is checked against the stored password at decision block 96. On the medium, the password is preferably encrypted.

In preferred embodiments of the present invention, in order for the anti-theft feature to be activated, additional conditions must exist. Of course, any set of additional conditions may be employed as an alternative to the preferred set of additional conditions described herein, as is appreciated by one of ordinary skill in the art. At decision block 98, the condition of the parking brake is checked. In preferred embodiments, the parking brake has to be engaged in order for the anti-theft feature to become activated. At decision block 100, the condition of the vehicle speed sensor is checked. In preferred embodiments, the vehicle speed sensor has to show 0 miles per hour in order for the anti-theft protection feature to become activated. As described below, additional conditions are preferably checked when the desired theft protection mode is toggle idle mode (preferably implemented as OPTIMIZED IDLE). Alternatively, other conditions such as engine speed and load may be checked. In some application, such as non-highway vehicles without a parking brake or a vehicle speed sensor, engine speed and/or load are suitable conditions to check.

At block 102, in preferred embodiments of the present invention, a desired theft protection mode is determined from a plurality of available theft protection modes. At decision blocks 104 and 106, additional conditions are checked when the desired operation mode is OPTIMIZED IDLE or any other suitable toggle idle mode allowing for automatic shutdown and restarting of the engine to maintain a desired temperature in a sleeper cab of the truck, oil temperature, or battery voltage.

When OPTIMIZED IDLE or another suitable toggle idle mode is not the desired mode, the desired mode is determined as either idle mode, speed limited mode, or no start mode. Decision boxes 114 and 118 illustrate an exemplary sequence of comparisons to determine the desired theft protection mode. Of course, it is to be appreciated that the desired theft protection mode may be determined based on engine conditions, or may be selected by a vehicle operator when the password is entered.

Again, it is preferred that various engine condition requirements are satisfied, along with the password being correct, to allow activation of theft protection mode. In preferred embodiments, the ECM will return a message indicating which condition was not met if the vehicle operator attempts to enter a theft protection mode and one of the required engine conditions is not met. For example, if the parking brake is not engaged when the vehicle operator enters the password, a message is sent from the ECM to the display device to alert the operator that the parking brake has to be engaged for theft protection to be activated. Preferably, the ECM allows for an unlimited number of attempts to enter the correct password, giving the driver an opportunity to resubmit the password to enable the anti-theft feature after attempting to meet the required condition.

As is appreciated by one of ordinary skill in the art, there are a variety of different theft-protection modes that embodiments of the present invention may employ. It is to be appreciated that in embodiments of the present invention, at least one of the theft-protection modes permits the engine to operate at idle. Of course, in addition to the idle theft-protection mode, various other theft-protection modes may be provided.

At block 116, idle mode permits the engine to operate at idle. In preferred embodiments of the present invention, (straight) idle mode is selected by activating theft-protection mode while the engine is in idle. Of course, preferably, additional conditions must be met to activate theft protection as described above. In some embodiments of the present invention, after turning off the engine, the ECM does not allow the driver to restart the engine without entering the password. Alternatively, idle mode may be configured such that the driver may, as desired, turn the engine off and restart the engine while remaining in the idle theft protection mode. That is, the engine may be manually shutdown and restarted, however, the engine must remain at idle. Appropriately, if any of the additional conditions becomes unsatisfied while in anti-theft idle mode, the engine shuts down and cannot be restarted until the correct password is entered. Preferably, all modes operate this way, meaning that if any of the additional conditions becomes unsatisfied while in any anti-theft mode, the engine shuts down and cannot be restarted until the correct password is entered.

When the engine is shutdown and cannot be restarted without the correct password, this mode is called "no engine start mode" and is indicated at 122. No engine start mode, in preferred embodiments of the present invention, is selected by activating theft-protection mode while the engine is shutdown.

Further, yet another theft-protection mode is speed limit mode indicated at 120. In this mode, the ECM limits either road speed or engine speed. The limit value for road speed or engine speed is a calibrated value, and preferably is implemented so that interface 44 (FIG. 1) may be utilized to change the calibration value. Speed limiting can be very advantageous. For example, this feature could allow fleets to protect their vehicles from theft while in a truck yard or maintenance garage, but allow maintenance personnel the ability to move the truck if needed (but with, for example, a 5 miles per hour road speed limit or a 1,000 rpm engine speed limit, or any other suitable scheme).

Yet another mode for anti-theft protection is toggled idle mode, which is preferably implemented as a part of OPTIMIZED IDLE mode. OPTIMIZED IDLE mode is similar to the straight idle mode described above, with the exceptions being that OPTIMIZED IDLE automatically shuts down and restarts the engine as necessary to maintain a desired condition such as a desired temperature in the vehicle cab, desired oil temperature, or battery voltage. Of course, it is to be appreciated that in both of the idle theft protection modes (that is, straight idle and OPTIMIZED IDLE), the engine is idled at an rpm sufficient to power the current electrical load. Therefore, the rpm for the idle protection modes may vary based on electrical loads such that prolonged use the anti-theft operating mode does not drain the battery charge. Toggle idle mode may be selected by activating the anti-theft system while at idle, with a selector switch being used to specify "straight idle" or "toggle idle" mode. Alternatively, an ECM calibration value may specify the desired mode.

In all of the different protection modes 112, 116, 120, and 122, a correct password is required to return the engine to normal operating mode, as indicated in block 124. Correct entry of the password causes decision box 126 to direct flow to end block 128, meaning that the engine has returned to its previous operating mode. An incorrect password, as indicated by decision block 126, results in the engine staying in whichever anti-theft mode that it was in.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle anti-theft method for use in a vehicle having an internal combustion engine, an engine controller, and a memory, the engine controller being configured to operate the engine in a plurality of different modes including a theft protection mode that limits engine output while allowing the engine to run, the method comprising:

receiving an arm password;

comparing the arm password with a stored password in the memory; and operating the engine in the theft protection mode when the arm password matches the stored password, wherein the engine controller limits engine output but allows the engine to run at idle and wherein the engine controller permits the engine to shutdown and then restart to idle while remaining in the theft protection mode.

2. The method of claim 1 wherein receiving the arm password comprises:

manually entering the arm password.

3. The method of claim 1 wherein receiving the arm password comprises:

inserting a removable storage medium into a storage medium reader; and reading the arm password from the removable storage medium.

4. The method of claim 1 wherein the vehicle has an engagable parking brake, the method further comprising:

checking a condition of the parking brake, wherein the engine is operated in the theft protection mode when the arm password matches the stored password and the parking brake is engaged, and otherwise, the engine is operated in a different mode.

5. The method of claim 1 wherein the vehicle has a vehicle speed sensor, the method further comprising:

checking a condition of the vehicle speed sensor, wherein the engine is operated in the theft protection mode when the arm password matches the stored password and the vehicle speed sensor indicates that the vehicle is stationary, and otherwise, the engine is operated in a different mode.

6. The method of claim 1 wherein the theft protection mode for the engine further permits the engine to operate in a speed limited mode in addition to idle operation.

7. The method of claim 6 wherein the speed limited mode is defined by an engine speed limit which engine speed is not permitted to exceed when in the theft protection mode.

8. The method of claim 6 wherein the speed limited mode is defined by a road speed limit which vehicle road speed is not permitted to exceed when in the theft protection mode.

9. A vehicle anti-theft method for use in a vehicle having an internal combustion engine, an engine controller, and a memory, the engine controller being configured to operate the engine in a plurality of different modes including a plurality of theft protection modes, the method comprising:

receiving an arm password;

comparing the arm password with a stored password in the memory;

determining a desired theft protection mode from the plurality of theft protection modes, the plurality of theft protection modes including at least one toggle idle mode that limits engine output while allowing the engine to run at idle and while switching between shutdown and idle based on a vehicle condition; and operating the engine in the desired theft protection mode, when the arm password matches the stored password.

10. The method of claim 9 wherein the vehicle condition is selected from the group consisting of: vehicle cab temperature, oil temperature, and battery voltage.

11. A vehicle anti-theft system for use in a vehicle having an internal combustion engine, an engine controller, and a memory, the system comprising:

a display unit including an input device for receiving an arm password; and control logic operative to compare the arm password with a stored password in the memory, the control logic being further operative to determine a desired theft protection mode from a plurality of theft protection modes, the plurality of theft protection modes including at least one idle mode wherein the engine controller limits engine output while allowing the engine to run at idle and wherein the engine controller permits the engine to shutdown and then restart to idle while remaining in the theft protection mode, and a no engine start mode wherein the engine is shutdown and is not permitted to restart, wherein the desired theft protection mode is determined as the at least one idle mode if the engine is operating at idle upon receiving the arm password, and the desired theft protection mode is determined as the no engine start mode if the engine is shutdown upon receiving the arm password, the control logic being further operative to operate the engine in the desired theft protection mode, when the arm password matches the stored password.

12. The system of claim 11 wherein the input device is a keypad for use by a vehicle operator to manually enter the arm password.

13. The system of claim 11 wherein the input device is a storage medium reader for reading the arm password from a removable storage medium that is placed at the reader by a vehicle operator.

14. A vehicle anti-theft method for use in a vehicle having an internal combustion engine, an engine controller, and a memory, the engine controller being configured to operate the engine in a plurality of different modes including a theft protection mode that limits engine output while allowing the engine to run, the method comprising:

receiving an arm password;

comparing the arm password with a stored password in the memory; and operating the engine in the theft protection mode when the arm password matches the stored password, wherein the engine controller limits engine output but allows the engine to run in a speed limited mode in which vehicle speed is effectively limited by the engine controller with the engine controller allowing the vehicle to be driven by a user, subject to the effective vehicle speed limit.

15. The method of claim 14 wherein the speed limited mode is defined by an engine speed limit which engine speed is not permitted to exceed when in the theft protection mode.

16. The method of claim 14 wherein the speed limited mode is defined by a road speed limit which vehicle road speed is not permitted to exceed when in the theft protection mode.

17. The method of claim 14 wherein receiving the arm password comprises:

manually entering the arm password.

18. The method of claim 14 wherein receiving the arm password comprises:

inserting a removable storage medium into a storage medium reader; and reading the arm password from the removable storage medium.

19. The method of claim 14 wherein the vehicle has an engageable parking brake, the method further comprising:

checking a condition of the parking brake, wherein the engine is operated in the theft protection mode when the arm password matches the stored password and the parking brake is engaged, and otherwise, the engine is operated in a different mode.

20. The method of claim 14 wherein the vehicle has a vehicle speed sensor, the method further comprising:

checking a condition of the vehicle speed sensor, wherein the engine is operated in the theft protection mode when the arm password matches the stored password and the vehicle speed sensor indicates that the vehicle is stationary, and otherwise, the engine is operated in a different mode.

* * * * *

UNITED STATES PATENT AND TRADEMARK OFFICE
Certificate

Patent No. 6,356,186 B1

Patented: March 12, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Todd Louis Price, Walled Lake, MI; Simon Alexander Robbie, Ypsilanti, MI; Thomas Alan Diefenbaker, Troy, MI; and Douglas Wright Salter, Allen Park, MI.

Signed and Sealed this First Day of April 2003.

JEFFERY A. HOFSASS
*Supervisory Patent Examiner*
Art Unit 2632